April 8, 1947.　　　　　H. M. HUGE　　　　　2,418,642
FREQUENCY REDUCER
Filed June 5, 1944　　　　　　　　　2 Sheets-Sheet 1

INVENTOR.
HENRY M. HUGE
BY Woodling and Krost
ATTORNEYS.

April 8, 1947.   H. M. HUGE   2,418,642
FREQUENCY REDUCER
Filed June 5, 1944   2 Sheets-Sheet 2

INVENTOR.
HENRY M. HUGE
BY Woodling and Krost
ATTORNEYS.

Patented Apr. 8, 1947

2,418,642

UNITED STATES PATENT OFFICE 2,418,642

FREQUENCY REDUCER

Henry Martin Huge, Lorain, Ohio, assignor of one-half to Closman P. Stocker and one-half to E. M. Heavens Application June 5, 1944, Serial No. 538,839

7 Claims. (Cl. 172—281)

1

This invention relates to frequency changers, and in particular, to a frequency changing transformer capable of generating subharmonics of the input frequency. The subject matter of this application is an extension of the invention shown and described in my application Serial No. 505,611 filed October 9, 1943.

It is an object of this invention to generate subharmonics of the input frequency in a static frequency changer.

Another object of this invention is to provide an improved method for automatically starting subharmonic oscillations by means of a relay.

Still another object of this invention is to produce a frequency changing transformer for the generation of subharmonics.

Figure 1:
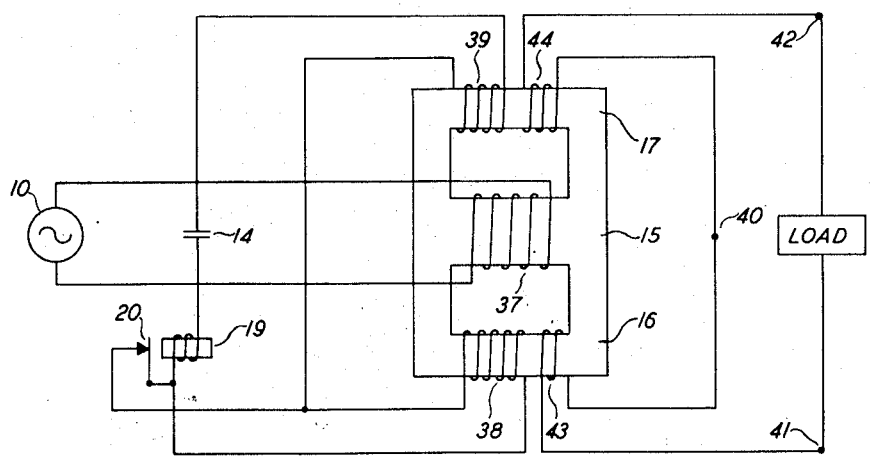
Figure 2:
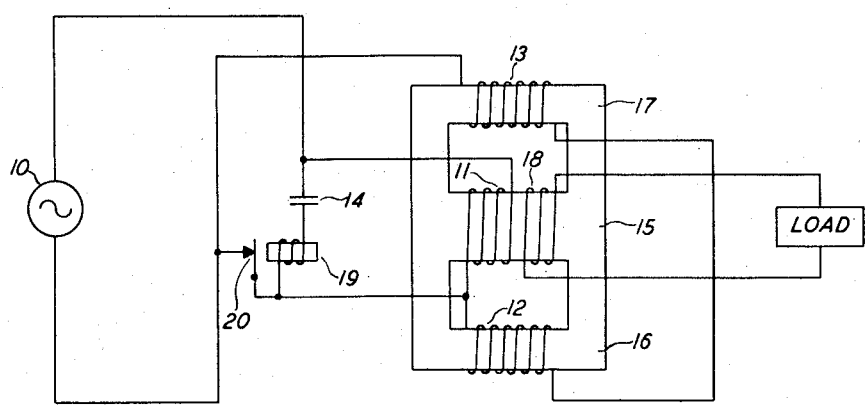
Figure 3:
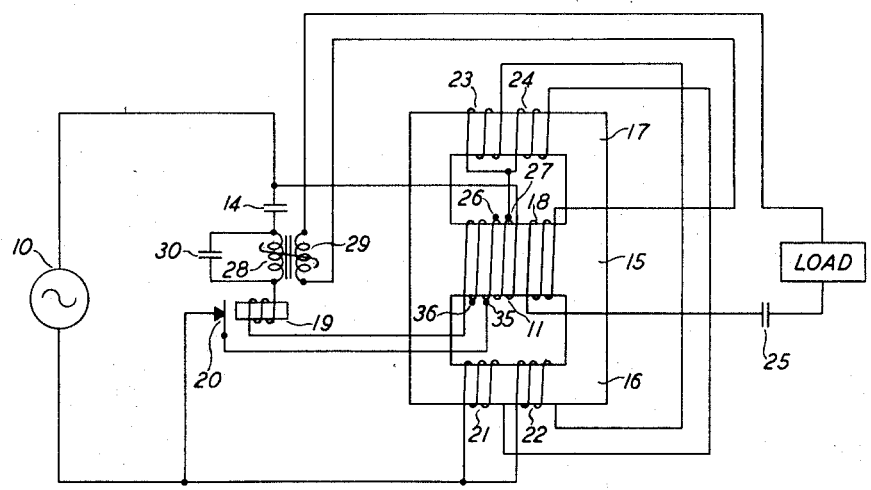
Figure 4:
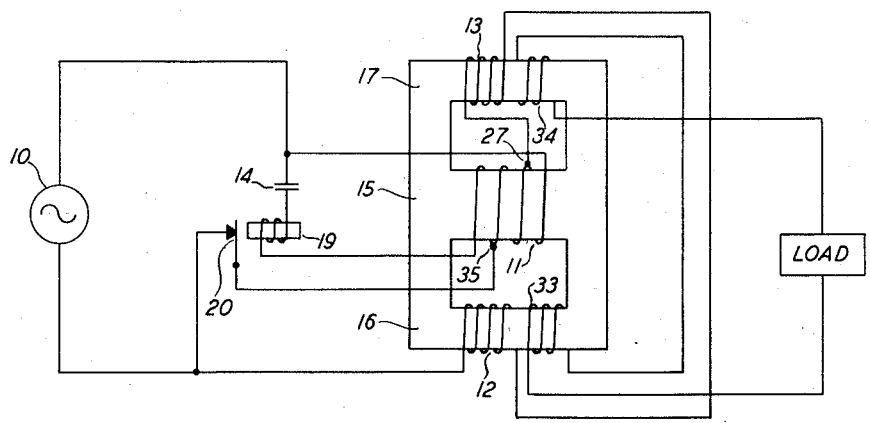

Other objects and a better understanding of my invention may be had by referring to the following specifications and claims, together with the accompanying drawings:

Figure 1 shows diagrammatically a subharmonic generator made according to my invention with a three-legged saturable magnetic core having the primary winding on the central core member, Figure 2 shows a different winding arrangement on the three-legged core and also shows my improved method of starting subharmonic oscillations, Figure 3 is a modification of the arrangement of Figure 2 provided with two windings for operation on two different input voltages, and Figure 4 is another modification of the arrangement of Figure 2 showing a different output arrangement.

With more particular reference to Figure 1, there is shown a magnetic core structure having three core members 15, 16 and 17. Primary winding 37 on the central core member 15 is energized from the alternating current source 10. The secondary windings 38 and 39 on the two outer core members 16 and 17 are connected in series with each other and connected to capacitor 14 in series with relay winding 19. The secondary windings 38 and 39 are polarized oppositely with respect to the primary winding 37, so that the total voltage from source 10 which is applied to capacitor 14 is the difference between the voltages in windings 38 and 39. Relay contacts 20 short-circuit secondary winding 38 when the relay winding 19 is not energized. Under this condition, the flux of the source frequency through the central core member 15 is forced through core member 17 for its return path, inducing a voltage in winding 39 which is applied to capacitor 14. The charging

2 current of capacitor 14 flowing through relay winding 19 opens the relay contacts 20 and inserts secondary winding 38 in the circuit. The charge on capacitor 14 at the moment the relay contacts open then flows away through the secondary windings 38 and 39, magnetizing the core and starting the subharmonic oscillations in the secondary circuit. The subharmonic current through capacitor 14 and relay winding 19 holds open the relay contacts 20 as long as the oscillations continue, but should they stop, the relay recloses contacts 20 and restarts the oscillations.

In normal operation, the flux through the central core member 15 is predominantly of the frequency of source 10, because the primary winding 37 is connected directly to source 10. The subharmonic flux flows around through core members 16 and 17 and in these members is superimposed on the flux of the source frequency. The superimposed fluxes saturate the core and their interaction converts power from the source frequency to the subharmonic frequency to sustain the subharmonic oscillations. I prefer to make windings 38 and 39 with somewhat different numbers of turns when core members 16 and 17 are magnetically equal. This provides coupling between the primary winding 37 and the secondary windings. Under low flux density, the coupling between primary and secondary is weak but it increases with increasing flux density. The effect of the winding arrangement shown, therefore, is to provide a saturable leakage reactance between the primary and secondary circuits. The variations in saturation produced by the subharmonic oscillations initiated by the action of the relay contacts 20 act to maintain the subharmonic oscillations.

The output windings 43 and 44 on the core members 16 and 17 are connected in series with each other and preferably polarized to add the subharmonic voltages induced in them. By varying the relative numbers of turns on these two windings, I am able to control the harmonic content of the voltage supplied to the load connected to the output terminals 41 and 42. For some load requirements the harmonic content of the voltage appearing across either one of the windings 43 or 44 may be suitable for supplying to the load. In this case the load may be connected across output terminals 40 and 41 or 40 and 42, eliminating the necessity for two output windings connected in series.

The winding arrangement shown in Figure 2 might be considered as approximately the reverse of that shown in Figure 1. In Figure 2 the primary windings 12 and 13 are connected in series and wound on the two outer core members 16 and 17. With core members 16 and 17 magnetically equal, windings 12 and 13 may be made with substantially the same number of turns to provide cancelling fluxes through the central core member 15. The secondary winding 11, on core member 15, is connected to the capacitor 14 in series with relay winding 19 and is also connected in series with the primary windings to provide the necessary coupling between the primary and secondary circuits.

When the voltage from source 10 is first applied, the normally closed relay contacts 20 connect the winding 11 directly to the source 10. The current from source 10 flowing through capacitor 14 and relay winding 19 operates the relay and opens contacts 20. The charge on capacitor 14 when the relay contacts open flows off through winding 11 on core member 15, magnetizing the core and starting the subharmonic oscillations through winding 11 and capacitor 14. In operation, the flux through core member 15 is largely subharmonic flux. This is true because the low impedance of capacitor 14 at the frequency of source 10 tends to short-circuit the winding 11 at the frequency of source 10. The subharmonic flux through core member 15 divides between the outer core members 16 and 17 which act as its return path. Since these outer core members are magnetized by source 10, the subharmonic flux in them is superimposed on the fundamental frequency flux produced by source 10. The superposition of the fluxes in these core members, which become saturated by the combined magnetization, produces a power transfer from the fundamental to the subharmonic frequency and sustains the subharmonic oscillation in the circuit of capacitor 14 and secondary winding 11. The subharmonic voltage is supplied to a load by means of the output winding 18 on core member 15. The output frequency most easily produced is one-third the input frequency, but other subharmonics can also be produced when the elements are suitably proportioned.

The unbalanced magnetization of the outer core members 16 and 17 produced by the secondary winding 11 connected in series with them provides coupling between the centrally located core member 15, which carries secondary winding 11, and the outer core members 16 and 17 which carry the primary windings 12 and 13. The coupling thus provided between primary and secondary is not a tight coupling, but has an effective saturable leakage reactance between the primary and secondary circuits. It is also possible to provide the required coupling without connecting the secondary winding 11 in series with the primary windings by making primary windings 12 and 13 unequal or otherwise unbalancing the structure.

The method of starting the oscillations shown in Figure 2, constitutes an improvement over the method shown in Figure 1. I have found that improved starting action can be obtained with this method because the capacitor 14 is connected directly to the energizing source during the starting interval and the effects of leakage reactance between the source and the capacitor which may occur with the arrangement of Figure 1 are substantially eliminated.

Figure 3 is the schematic diagram of the preferred embodiment of my invention, provided with double windings on the outer core members 16 and 17 and provided with a step-up winding for supplying increased voltage to capacitor 14. Primary windings 21 and 22 on core member 16 in Figure 3 take the place of primary winding 12 in Figure 2 and primary windings 23 and 24 on core member 17 in Figure 3 take the place of primary winding 13 in Figure 2.

The secondary winding 11 is provided with taps 26 and 27 so that only a portion of the secondary winding 11 is connected in series with the primary windings in the energizing circuit. The primary windings in Figure 3 are shown connected in parallel, and connected to tap 27 on winding 11, for operation on a low input voltage, but these windings may be connected in series with each other in which case I prefer to connect them to tap 26 instead of tap 27 to provide for operation on an input voltage twice as great.

Secondary winding 11 is connected to capacitor 14 and relay winding 19 as in Figure 2. However, Figure 3 shows an arrangement for introducing high order harmonics in the voltage supplied to the load. These harmonics are provided by the saturable inductance having windings 28 and 29. The winding 28 is connected in series with capacitor 14 and is shunted by a capacitor 30 which serves to accentuate the desired harmonics in the output voltage. Winding 29 of the saturable inductance is connected in series with the output winding 18 to supply the high order harmonics to the load. These harmonics are frequently required when the converter is used to supply telephone ringing current, in which case the audible components of the output voltage serve as an audible ringing tone.

The arrangement shown in Figure 3 makes it possible to supply increased voltage to the capacitor 14 so that a small high-voltage capacitor of an economical size can be used. One end of secondary winding 11 is connected directly to the source 10 and to capacitor 14 in Figure 3. The relay contacts 20 connect the opposite side of source 10 to a tap 35 on secondary winding 11 during the starting interval. In this way the voltage of source 10 is stepped up and fed to the capacitor to provide the initial charge for starting the subharmonic oscillations.

The tap 35 is provided so when the converter is operated on the higher input voltage with the primary windings in series, the voltage supplied to the capacitor 14 during the starting interval can be made substantially the same as when operated on the lower input voltage. As explained in connection with Figure 2, this method of energizing the capacitor has the advantage of providing a relatively direct coupling to the energizing source and minimizes any possibility of leakage reactance effects during the starting interval.

The operation of the circuit of Figure 3 is substantially the same as the operation of the circuit of Figure 2. The charging current of capacitor 14 through relay winding 19 opens the relay contacts 20 and causes the discharge current of capacitor 14 to initiate the subharmonic oscillations. Capacitor 25 in Figure 3 is connected in series with the load to prevent possible overloads on the converter from stopping the subharmonic oscillations.

Figure 4 shows a modified output winding arrangement which may be applied also to the circuits shown in Figures 2 and 3 or which may be combined with the arrangements shown in Figures 2 and 3 to produce the desired results. Figure 4 differs from Figure 3 only in its output winding arrangement and in that it has single windings, and is not arranged for operation on two different input voltages as is Figure 3. The secondary windings 33 and 34 in Figure 4 on the two outer core members 16 and 17 are preferably phased to add the subharmonic voltages induced in them. They may be proportioned in any desired manner to provide varying harmonic content in the voltage supplied to the load; or in some cases, it may be possible to use the output winding arrangement mentioned in connection with Figure 1, in which only one output winding on one of the outer core members is used.

In operating characteristics, the circuit shown in Figure 4 is substantially the same as that shown in Figure 3. The secondary winding 11 is provided with a tap 35 connected to the relay contacts 20 to step up the starting voltage to capacitor 14. The primary windings 12 and 13 are connected in series with each other and with a portion of secondary winding 11 as provided by the tap 27 on winding 11. The flux through the central core member 15 is predominantly subharmonic flux and it divides unequally between the two outer core members 16 and 17 in its return path.

The arrangements shown for varying the harmonic content of the load voltage are merely examples of many circuit modifications which might be applied to this end. For example, the harmonic content of the output voltage supplied from the secondary winding 18 in Figure 3 may be varied when it is required, by supplying the capacitor 14 with voltage both from secondary winding 11 and from one of the primary windings. This modified connection allows more or less flux of the frequency of source 10 to flow through the central core member 15, depending upon the amount and polarity of the primary voltage which is supplied to capacitor 14.

Although I have described my invention with a certain degree of particularity, it is to be understood that the present disclosure has been made only by way of example, and that numerous changes in the details of construction and the combination and arrangement of parts may be resorted to without departing from the spirit and scope of the invention as hereinafter claimed.

I claim as my invention:

1. A frequency reducer comprising in combination a magnetic core having first, second, and third core members, the first and second core members having substantially the same magnetic characteristics, first and second substantially equal windings respectively on said first and second core members adapted to be energized from a source of alternating current and to produce opposing fluxes in the third core member, a third winding on the third core member, a capacitor adapted to be energized from said third winding, at least a portion of the third winding being adapted to be energized from the source in series with the first winding, and starting means adapted to connect said third winding to said source of alternating current to initiate oscillations of the reduced frequency in the third winding.

2. A frequency reducer comprising in combination a magnetic core having first, second, and third core members, first and second windings respectively on said first and second core members adapted to be energized from a source of alternating current and to produce opposing fluxes in the third core member, a third winding on the third core member, a capacitor adapted to be energized from said third winding, at least a portion of the third winding being adapted to be energized from the source in series with the first winding, and starting means adapted to connect said third winding to said source of alternating current to initiate oscillations of the reduced frequency in the third winding.

3. A frequency reducing arrangement comprising in combination a magnetic core having first, second, and third core members with first, second, and third windings respectively thereon, the first, second, and third windings being connected in series and adapted to be energized by an alternating current source, a capacitor adapted to be energized from the third winding, a starting relay adapted to connect said third winding to said source to produce an initial charge on the capacitor to initiate oscillations of the reduced frequency through it, and an output circuit for supplying the reduced frequency to a load.

4. A subharmonic generator adapted to be energized by a source of alternating current and to supply a load with power at a subharmonic frequency, comprising in combination a magnetic core having first, second, and third core members, windings on said first and second core members adapted to be energized by the source of alternating current, a winding on said third core member, a capacitor connected across said winding on the third core member, and a relay adapted to connect at least a portion of said winding on the third core member across said source of alternating current to supply an initial charge to said capacitor to start subharmonic oscillations through the capacitor.

5. A subharmonic generator comprising in combination magnetic core means having at least three core members, primary winding means on the core means adapted to be energized by a source of alternating current, secondary winding means on the core means, capacitive means connected across the secondary winding means, and starting means comprising a relay adapted to connect said secondary winding means to the source of alternating current to produce a starting transient in the secondary winding means to initiate subharmonic oscillations therein, said primary and secondary winding means being disposed on at least two of the core members and having effectively a saturable leakage reactance between them.

6. A subharmonic generator comprising in combination, magnetic core means having at least three core members, primary winding means on the core means adapted to be energized by a source of alternating current, secondary winding means on the core means, capacitive means energized by the secondary winding means, starting means adapted to connect the secondary winding means to the source to produce a starting transient to initiate subharmonic oscillations through the capacitive means, and output winding means inductively related to the secondary winding means, said winding means being disposed on at least two of the core members with an effective saturable leakage reactance between the primary and secondary winding means.

7. In a frequency reducer comprising saturable magnetic core means having first, second, and third core members with first, second, and third winding means respectively thereon, with a capacitor energized from the third winding means and with the first and second winding means being serially connected and adapted to produce opposing fluxes in the third core member when energized by an alternating current source, starting means for initiating subharmonic oscillations in the third winding means, said starting means comprising a relay adapted to connect the third winding means to the source to produce an initial charge on the capacitor.

HENRY MARTIN HUGE.

REFERENCES CITED

The following references are of record in the file of this patent:

UNITED STATES PATENTS

| Number | Name | Date |
| --- | --- | --- |
| 2,364,532 | Huge | Dec. 5, 1944 |